United States Patent [19]

Shash

[11] Patent Number: 5,512,021
[45] Date of Patent: Apr. 30, 1996

[54] VARIABLE RATIO TRANSMISSION

[76] Inventor: Joseph L. Shash, P.O. Box 189, Bunola, Pa. 15020

[21] Appl. No.: 194,393

[22] Filed: Feb. 10, 1994

[51] Int. Cl.⁶ .......................... F16H 47/08; F16H 15/50; F16H 3/72
[52] U.S. Cl. .................. 475/1; 475/72; 475/73; 475/80; 475/107
[58] Field of Search .................. 475/1, 2, 72, 73, 475/80, 107

[56] References Cited

U.S. PATENT DOCUMENTS

| | | | |
|---|---|---|---|
| 1,161,066 | 11/1915 | Minor | 475/107 |
| 1,261,312 | 4/1918 | Spade | 475/107 |
| 2,212,046 | 8/1940 | Ross | 475/107 |
| 2,960,890 | 11/1960 | Davis | 475/107 X |
| 3,944,253 | 3/1976 | Ripley | 475/107 X |
| 4,188,859 | 2/1980 | Van Wagenen et al. | 91/499 |
| 4,341,132 | 7/1982 | Burdick | 475/72 |
| 4,637,275 | 1/1987 | Whalen | 475/72 |
| 5,186,692 | 2/1993 | Gleasman et al. | 475/80 X |

FOREIGN PATENT DOCUMENTS

| | | | |
|---|---|---|---|
| 151946 | 8/1985 | European Pat. Off. | 475/72 |
| 828187 | 1/1952 | Germany | 475/1 |
| 4032851 | 10/1991 | Germany | 475/72 |
| 60-222643 | 11/1985 | Japan | 475/72 |
| 2259338 | 3/1993 | United Kingdom | 475/107 |

*Primary Examiner*—Charles A. Marmor
*Assistant Examiner*—Nathan O. Jensen
*Attorney, Agent, or Firm*—Patrick Garrett

[57] ABSTRACT

A variable ratio transmission for an engine. The transmission comprises a planetary gear system having a planet ring with a plurality of planet gears rotatably connected thereto. The planetary gear system also comprises an outer drum gear and an inner sun gear. There is also a mechanism for providing a variable force against the drum gear so that the sun gear is driven by the engine with a variable ratio. The planet ring acts as an input driven by the engine and the sun gear acts as an output, such as to wheels. It should be appreciated that the input, output and providing mechanism, against the remaining gear, can be interchanged in a variety of ways to achieve the intended result of a variable transmission. Preferably, the providing mechanism provides a continuous variable force against the drum gear so that the transmission can provide a continuous variable ratio output. Thus the transmission can have an infinite number of gears ratios. Further, the providing mechanism can selectively provide a positive or negative three to the drum gear so as to variably drive the drum gear in forward or reverse.

4 Claims, 2 Drawing Sheets

VARIABLE RATIO TRANSMISSION

FIELD OF THE INVENTION

The present invention is related in general to mechanical transmissions. More specifically, the present invention is related to a transmission which utilizes a planetary gear system to produce a continuous variable ratio output.

BACKGROUND OF THE INVENTION

It is well known in the art of automobiles to provide a transmission between the motor and wheels so as to most effectively use the power of the engine at different speeds. Conventional transmissions are either manual or automatic. With manual transmissions there are a number of fixed ratio gears which are manually shifted with a stick shift. With an automatic transmission the gears are shifted automatically. Unfortunately with both of these transmissions there is available only a fixed number of gears and thus only a fixed number of velocity/torque ratios. Therefore the power transmission is not seamless. The present invention discloses a transmission which provides a continuous variable ratio output.

SUMMARY OF THE INVENTION

The present invention is a variable ratio transmission for an engine. The transmission comprises a planetary gear system having a planet ring with a plurality of planet gears rotatably connected thereto. The planetary gear system also comprises an outer drum gear and an inner sun gear. There is also a mechanism for providing a variable force against the drum gear so that the sun gear is driven by the engine with a variable ratio. The planet ring acts as an input driven by the engine and the sun gear acts as an output, such as to wheels. It should be appreciated that the input, output and providing mechanism, against the remaining gear, can be interchanged in a variety of ways to achieve the intended result of a variable transmission. Preferably, the providing mechanism provides a continuous variable force against the drum gear so that the transmission can provide a continuous variable ratio output. Thus the transmission can have an infinite number of gears ratios. Further, the providing mechanism can selectively provide a positive or negative force to the drum gear so as to variably drive the drum gear in forward or reverse.

BRIEF DESCRIPTION DRAWINGS

DESCRIPTION OF THE PREFERRED EMBODIMENT

Figure 1B:
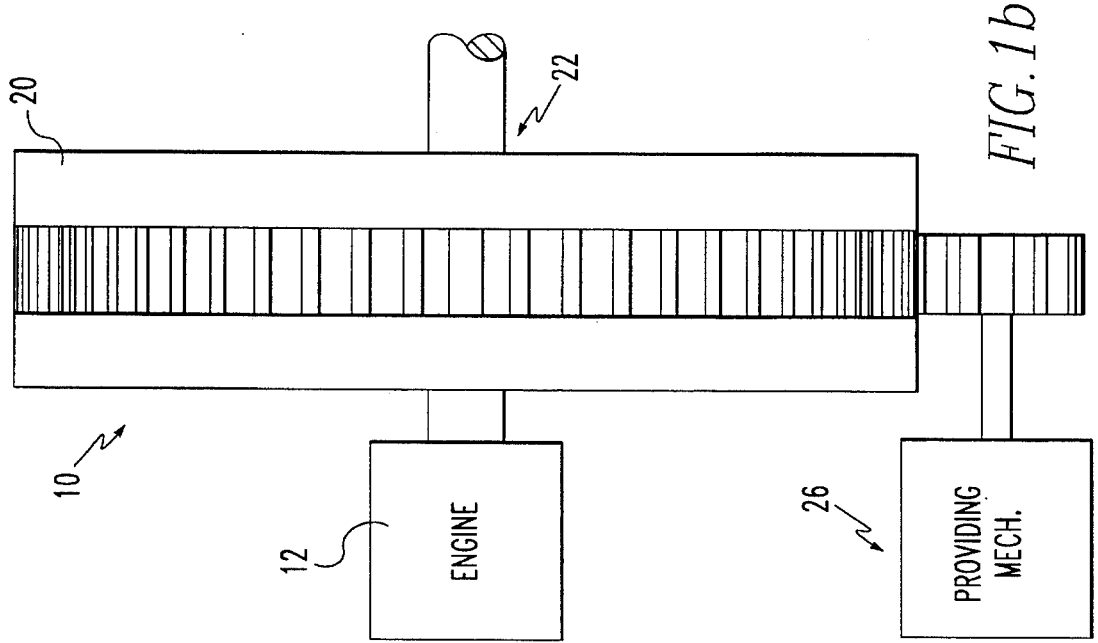
FIGS. 1a and 1b are schematic representations showing a front view and side view, respectively, of basic embodiment of the variable ratio transmission.
Figure 1A:
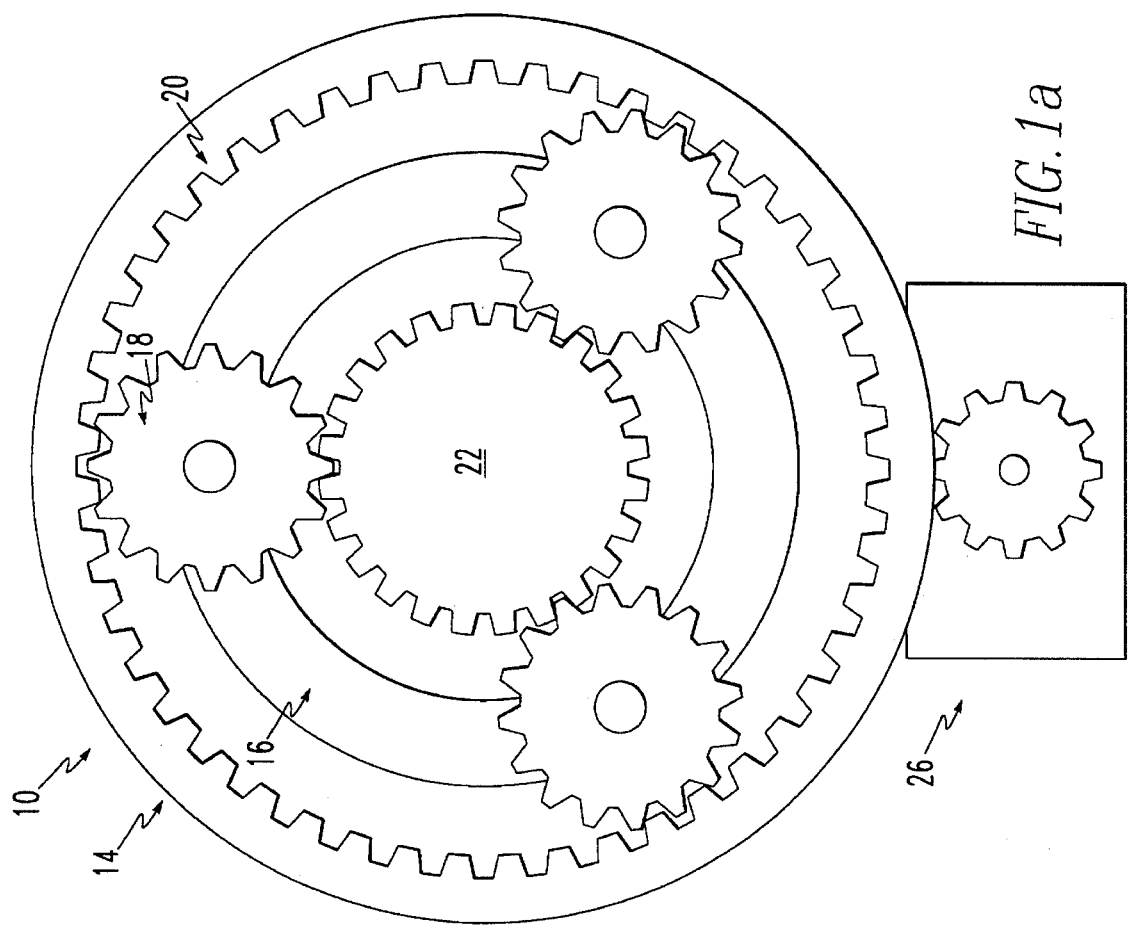

Referring now to the drawings wherein like reference numerals refer to similar or identical parts throughout the several views and more importantly to figures 1a and 1b there is shown a variable ratio transmission 10 for an engine 12. The transmission 10 comprises a planetary gear system 14 having a planet ring 16 with a plurality of planet gears 18 rotatably connected thereto. The planetary gear system 14 also comprises an outer drum gear 20 and an inner sun gear 22. There is a mechanism 26 for providing a variable force against the drum gear 20 so that the sun gear 22 is driven by the engine 12 with a variable ratio. The planet ring 16 acts as an input driven by the engine 12 and the sun gear 22 acts as an output, such as to wheels. It should be appreciated that the input, output and providing mechanism 26, against the remaining gear, can be interchanged in a variety of ways to achieve the intended result of a variable transmission. Preferably, the providing mechanism 26 provides a continuous variable force against the drum gear 20 so that the transmission can provide a continuous variable ratio output. Thus the transmission 10 can have an infinite number of gears ratios. Further, the providing mechanism 26 can selectively provide a positive or negative force to the drum gear 20 so as to variably drive the drum gear in forward or reverse.

Figure 2:
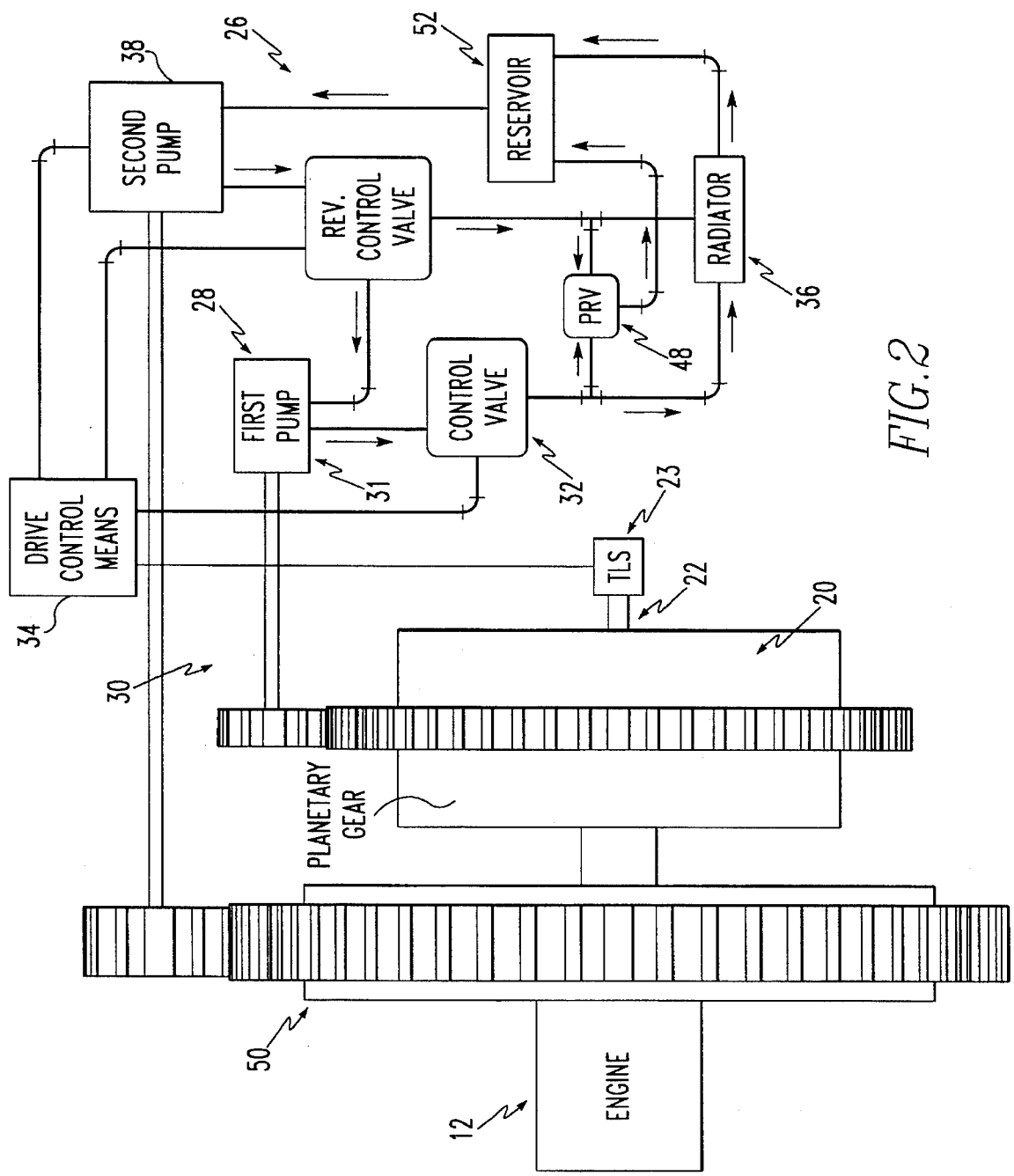
FIG. 2 is a schematic representation showing a preferred embodiment of the variable ratio transmission.

In a preferred embodiment and as best shown in FIG. 2, the providing mechanism 26 comprises a first pump 28 and a drive member 30, such as a gear belt or chain, connecting the first pump 28 to the drum gear 20. The first pump 28 has a control valve 32 for variably controlling pump output 31. The first pump 28 opposes the drum gear 30 as the control valve 32 is closed. When the control valve 32 is totally open all the power goes to spinning the drum gear 20. This represents neutral. When the control valve 32 is totally closed and fluid of the pump 28 cannot flow, the drum gear 20 cannot turn and thus all the power is transmitted to the sun gear 22. This represents the final ratio of the transmission 10. In between these two states the control valve 32 has a controlled variable output to resist the drum gear 20 a variable amount. Many types of pumps 28 and control valve 32 would work and can be found in any industrial catalog such as Grainger. The mechanics of the pump 28 are spun by a simple drive system between the pump 28 and the outside of the drum gear 20. A belt or chain can be used.

Preferably the providing mechanism 26 comprises drive control means 34 for controlling the control valve 32. The drive control means 34 controls the control valve 32 to provide the most desired ratio. As the restriction of the hydraulic fluid of the first pump 28 causes heat, the providing mechanism 26 can comprise means 36 for cooling hydraulic fluid of the first pump 28. The cooling means 36 can be integrated into a radiator, such as in an automobile.

In order to pump the fluid for cooling there can be a second pump 38 connected to the engine 12 such as through the flywheel 50. The second pump 38 can also be used to provide a reverse mode. For instance the input 40 to the first pump 28 can be from the second pump 38 through a reverse control valve 42. The reverse control valve 42, under control of the drive control means 34, can can control the amount of input to the first pump 28. When the reverse control valve 42 is progressively closed, shutting off the tube to cooling and the pressure relief valve 48, it will direct the full output of the second pump 38 into the first pump 28. This will cause the second pump to drive the first pump 28 to provide power to the drum gear 20, which will reverse the sun gear 22. The pressure relief valve 48 is used to split the fluid from the first pump 28 and second pump 38 between the cooling means 36 and the reservoir 52 as the cooking means might have a limited capacity.

The drive control means 34 preferably comprises a computer as is well known in the art of automobiles to control the engine. The computer preferably has torque sensing means, such as a torsion load sensor 23 on the sun gear 22, to adjust the control valve 32 to maintain the proper ratio during differing loads on the engine 12. Other well known sensors can also be used to influence the control valve 32. For instance throttle, vehicle speed, fuel parameters, or other vehicle parameters can be monitored. It should be appreciated that the variable force providing mechanism 26 can be any one of a variety of three providing mechanisms, such as an electromagnetic brake.

Although the invention has been described in detail in the foregoing embodiments for the purpose of illustration, it is to be understood that such detail is solely for that purpose and that variations can be made therein by those skilled in the art without departing from the spirit and scope of the invention except as it may be described in the following claims.

What is claimed:

1. A variable ratio transmission for an engine comprising:

a planetary gear system having a planet ring with a plurality of planet gears rotatably connected thereto, an outer drum gear and an inner sun gear, said planet ring acting as input driven by the engine, said sun gear acting as output;

a mechanism for providing a variable force against the drum gear so that the sun gear is driven by the engine through a variable ratio, said providing mechanism disposed adjacent to said drum gear, said providing mechanism capable of applying a force against the drum gear ranging from essentially zero to a force sufficient to fully immobilize the drum gear so that when the force is zero against the drum gear it is free to rotate and when the drum gear is fully stopped the planet gear is free to fully drive said sun gear;

wherein said providing mechanism provides a continuous variable force against the drum gear;

wherein the providing mechanism can selectively provide a positive or negative force to the drum gear so as to variably drive the sun gear in forward or reverse;

wherein the providing mechanism comprises a first hydraulic pump and a drive member connecting the first pump to the drum gear, said first pump having a control valve for variably controlling pump output; and wherein the providing mechanism comprises drive control means for controlling the control valve.

2. A variable ratio transmission as described in claim 1 wherein the providing mechanism comprises means for cooling hydraulic fluid of the pump.

3. A variable ratio transmission as described in claim 2 wherein the providing mechanism comprises a second pump for driving the drum gear, said second pump driven by the engine.

4. A variable ratio transmission as described in claim 3 wherein the providing mechanism comprises a reverse control valve connected to the second pump, the first pump and the cooling means said drive control means controlling the reverse control valve.

* * * * *